J. KLEINERTZ.
CHUCK.
APPLICATION FILED DEC. 4, 1914.

1,156,295.

Patented Oct. 12, 1915.

Witnesses:

Inventor:
J. Kleinertz
By
Attorneys

UNITED STATES PATENT OFFICE.

JULIUS KLEINERTZ, OF BRAUNSFELD, NEAR COLOGNE, GERMANY.

CHUCK.

1,156,295.  Specification of Letters Patent.  Patented Oct. 12, 1915.

Application filed December 4, 1914. Serial No. 875,544.

*To all whom it may concern:*

Be it known that I, JULIUS KLEINERTZ, engineer, citizen of Germany, subject of the King of Prussia and Emperor of Germany, residing at Braunsfeld, near Cologne-on-the-Rhine, in the Kingdom of Prussia and Empire of Germany, have invented new and useful Improvements in Chucks, of which the following is a specification.

This invention relates to improvements in chucks, in which cam faces provided on the internal periphery of a rotatable shell act on jaws working in a slotted body in the shell, and a primary object is to provide a chuck of this type of increased capacity and simplicity.

In my improved chuck the cam face for each jaw extends almost over the entire internal periphery of the shell, so that it is possible to obtain with cam faces cut at a small angle a large movement of the jaws, so that the chuck can be employed for tools of various size. The jaws slide in radial slots in the body of the chuck, and those end faces of the jaws which contact with the tool slant relatively to the periphery of the tool. The jaws are free to make certain movements in the radial slots, so that when the tool has been inserted and begins to work it causes the jaws to turn and to automatically grip it more firmly.

Another object is to provide that the jaws when at rest are held in a predetermined position, for which purpose springs are provided which press them against the one side of the slot and drive them radially outward.

A further object is to prevent the jaws being injured by shavings entering the chuck and settling between the faces sliding on one another. For this purpose I provide ribs or shoulders on the side of the jaw which normally bears against the side of the slot, so that a clearance is provided between the greater part of the jaw and the wall of the slot.

To these and other ends, the invention consists in the construction, arrangement and combination of parts described hereinafter and pointed out in the claims.

One illustrative embodiment of the invention is represented by way of example in the accompanying drawing, wherein:—

Figure 1:
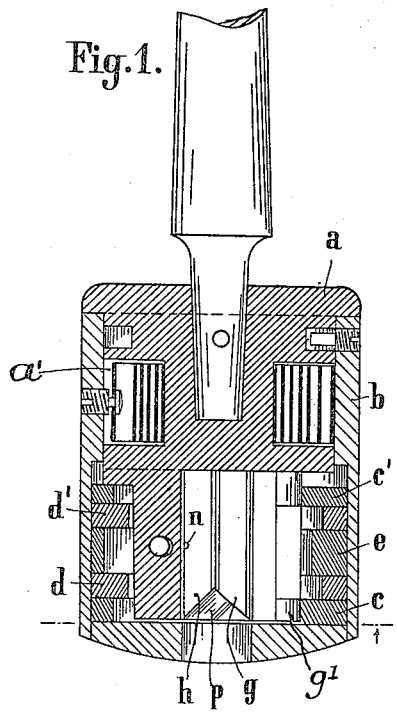
Figure 3:
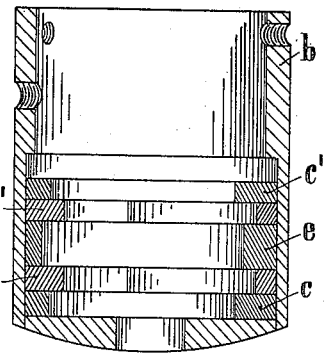
Figure 2:
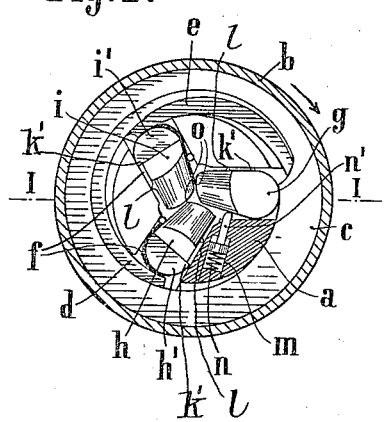
Figure 4:
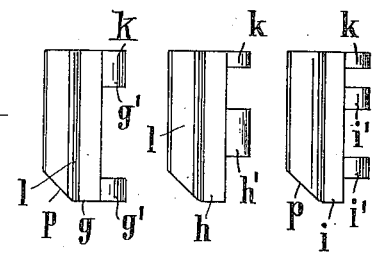

Figure 1 is a central longitudinal sectional view of a chuck according to my invention taken on the line I—I in Fig. 2, Fig. 2 is a cross-sectional view as seen from below, Fig. 3 is a longitudinal section through the shell alone showing particularly the cam faces, and Fig. 4 shows the three jaws in elevation. Referring to the drawing, the chuck comprises a body $a$ adapted to be mounted on the spindle of a drill press or other machine-tool; the annular shell $b$, having at its lower end an inserted cover having a central opening, is rotatably mounted in known manner on the said body, the two members being connected by a powerful spring $a'$. The annular cams $c$, $c'$, $d$, $d'$ and $e$ are in the embodiment shown inserted into the shell $b$. The body $a$ has three radial slots $f$ in which the three jaws $g$, $h$ and $i$ can slide. For guiding the jaws better in the slots each jaw has at its upper end a semi-circular lug $k$ which exactly fits the slot and, projects laterally a little beyond the one side of the jaw, so that shoulders $k'$ are formed. Further, each jaw is provided approximately in the middle of the same side with a V-shaped rib $l$, so that the jaw can bear with the two projections $k'$ and $l$ against the side of the slot. The principal object of this construction is to prevent the side faces of the jaw and the sides of the slots being cut away by shavings which become lodged between the two parts; such shavings can lie freely between the two parts, so that injury of the same is impossible.

The section of each jaw diminishes toward the center of the chuck so that each jaw can turn somewhat in its slot about an axis passing through its head $k$ and, when the chuck is not in use, the one side face of the jaw is disposed approximately radially, the other side face bearing against one side of the slot. Spiral springs $n$ are arranged in closed holes $m$ in the body $a$; these springs act on pins $n'$ which project into the slots and bear in front on the jaws, so that they tend to drive these radially outward and against the side of the slot, as shown in Fig. 2. In the illustrative embodiment it is assumed that the tool rotates when working, as indicated by the arrow in Fig. 2. The springs $n$ thus act in the opposite direction toward the driving sides of the slots.

Similarly shaped lugs $g'$, $h'$ and $i'$ are provided below the lugs $k$ on the rear of the jaws and bear against the cam faces of the shell. As shown in Fig. 4, the jaw $h$ has besides the lug $k$ only one lug $h'$ which coacts with the cam face $e$. Each of the two other jaws $g$ and $i$ has two lugs $g'$ and $i'$, respectively, the one lug $g'$ at the upper end of the jaw $g$ however being integral with the lug $h$ of this jaw. The lugs $i'$ and $g'$ and the cam faces $c$, $c'$ and $d$, $d'$ which coact therewith are located symmetrically relatively to the longitudinal direction of the jaws, so that the resultant pressure always acts in the middle and the jaws can move forward rectilinearly.

The inner or front end of each jaw, i. e. that located nearest the center of the chuck, has a face $o$, disposed eccentrically to the axis of oscillation of the jaw, which slanting face $o$ contacts with the periphery of the shank of the tool. When the tool is inserted the jaws $g$, $h$ and $i$ are pressed by the springs $n$ against the one side of the slots, but when the tool begins to work it turns the individual jaws in their slots against the action of the springs $n$ and, in consequence of the front faces of the jaws slanting, the tool is automatically clamped still more tightly. This clamping action is independent of the cam faces of the shell and becomes greater, the greater the working pressure.

At the lower end of the chuck into which the tool is inserted the jaws have beveled faces $p$. The end of the tool strikes on these faces and thereby forces the jaws outward as far as the position of the cam faces admits of such movement. Consequently no special device is required for pushing the jaws apart.

It will be understood from the above that the herein described improved chuck is characterized by great capacity and simplicity.

It is to be understood that changes and variations within the scope of the appended claims may be made in the described structure without departing from the scope of the invention.

I claim:—

1. In a chuck an annular shell having a plurality of internal cam faces arranged in different cross-sectional planes, a body having approximately radial slots and rotatable in said shell, a plurality of jaws, each movable rectilinearly and rotatably in one of said slots, said jaws having lugs bearing against said cam faces, the lugs of one jaw lying in different planes from the lugs of any other jaw and each lug bearing against a separate cam face.

2. In a chuck, an annular shell having a plurality of internal cam faces arranged in different cross-sectional planes, a body having approximately radial slots and rotatable in said shell, a plurality of jaws, each movable rectilinearly and rotatably in one of said slots, said jaws having lugs bearing against said cam faces, the lugs of one jaw lying in different planes from the lugs of any other jaw and each lug bearing against a separate cam face, said cam faces extending around almost the whole periphery of the shell.

3. In a chuck an annular shell having a plurality of internal cam faces arranged in different cross-sectional planes, a body having approximately radial slots and rotatable in said shell, a plurality of jaws, each movable rectilinearly and rotatably in one of said slots, said jaws having lugs bearing against said cam faces, the lugs of one jaw lying in different planes from the lugs of any other jaw and each lug bearing against a separate cam face, the jaws being each provided with a guide cam arranged in substantially the same plane.

4. In a chuck, an annular shell having a plurality of internal cam faces arranged in different cross-sectional planes, a body having approximately radial slots and rotatable in said shell, a plurality of jaws, each movable rectilinearly and rotatably in one of said slots, said jaws having lugs bearing against said cam faces, the lugs of one jaw lying in different planes from the lugs of any other jaw and each lug bearing against a separate cam face, the side faces of each jaw normally bearing against the side of the slot having projections adapted to prevent a close contact of the surfaces.

5. In a chuck, the combination with an annular shell having a plurality of internal cam faces arranged in different cross-sectional planes, and a body having approximately radial slots rotatable in said shell, of a plurality of jaws of irregular section each movable rectilinearly and rotatably in one of said slots, the one side face of each jaw being normally disposed approximately radially in the shell, the other side face of each jaw normally bearing against the one side of the slot containing the same, and the inner front face of each jaw being disposed eccentrically to the axis of oscillation of the jaw, one of the jaws having one lug located in the middle thereof adapted to coact with one cam face, and each of the other jaws having two lugs located symmetrically at either side of the plane containing the former lug and adapted to coact with the other cam faces.

In testimony whereof I have hereunto set my hand in presence of two subscribing witnesses.

JULIUS KLEINERTZ.

Witnesses:
 ANTON LEVY,
 MAX GOLLMERT.